US007210893B1

(12) United States Patent
Overman et al.

(10) Patent No.: US 7,210,893 B1
(45) Date of Patent: May 1, 2007

(54) FLATS MAIL AUTOTRAYER SYSTEM

(75) Inventors: John Overman, Evanston, IL (US); George Rabindran, Davie, FL (US); Steve Archer, Des Plaines, IL (US); Dan Rice, deceased, late of Buffalo Grove, IL (US); by Sherrie Rice, legal representative, Buffalo Grove, IL (US); Mike Stollenwerck, Libertyville, IL (US); Mike Ogarek, Chicago, IL (US)

(73) Assignee: Bowe Bell + Howell Postal Systems Company, Wheeling, IL (US)

( * ) Notice: Subject to any disclaimer, the term of this patent is extended or adjusted under 35 U.S.C. 154(b) by 433 days.

(21) Appl. No.: 09/694,653

(22) Filed: Oct. 23, 2000

(51) Int. Cl.
*B65G 37/00* (2006.01)

(52) U.S. Cl. .................................... 414/798.9; 209/900

(58) Field of Classification Search ............. 414/795.2, 414/794.9, 281, 411, 798.9; 209/539, 900; 271/149

See application file for complete search history.

(56) References Cited

U.S. PATENT DOCUMENTS 3,055,514 A * 9/1962 Ingvald et al. ........... 414/789.9
4,508,483 A * 4/1985 Hessling et al. ......... 414/797.5
4,655,663 A * 4/1987 Rosati ..................... 414/788.3
5,609,333 A * 3/1997 Mandel et al. ........... 270/58.09
5,803,704 A * 9/1998 Lazzarotti ................ 414/793.4
5,951,238 A * 9/1999 Duecker .................. 414/794.9
6,026,967 A * 2/2000 Isaacs et al. ................ 209/539
6,241,099 B1 * 6/2001 Hendrickson et al. ...... 209/542
6,422,806 B1 * 7/2002 Jenkins et al. ........... 414/795.2

FOREIGN PATENT DOCUMENTS

BE 0628233 * 8/1963 ............. 414/795.2

* cited by examiner

*Primary Examiner*—Charles A. Fox
(74) *Attorney, Agent, or Firm*—McDermott Will & Emery LLP

(57) ABSTRACT

A method and apparatus is disclosed for combining multiple small stacks of flats mailpieces into a single large stack of mailpieces and then transferring the large stack to a standard flats mail tray, all while maintaining the sequence order of the mail in the accumulated stack. The apparatus is comprised of three primary subsystems: a bridge conveyor, a stack accumulator, and an output tray station. The bridge conveyor carries mailpieces from the exit conveyor of a mail processing machine such as a collator, to the stack accumulator. The stack accumulator combines small stacks of mailpieces into large stacks in a desired sequence. The output tray station provides support for an empty tray as the accumulated mail stack is transferred to the tray, and then releases the filled tray in a controlled manner.

37 Claims, 14 Drawing Sheets

FLATS MAIL AUTOTRAYER SYSTEM

The present invention relates to a method and system for high speed accumulation/stacking of mailpieces and postal tray loading of the same. In particular, the method and system of the present invention comprises an apparatus that combines multiple small stacks of mailpieces into a single large stack of mailpieces in a desired sequence, and then automatically transfers the single large stack into a postal tray. Specifically, the present invention comprises an apparatus that creates an accumulated stack of mail while maintaining the sequence order of the mail in the accumulated stack by selectively placing successive small stacks on the bottom of the accumulated stack, and then selectively transferring the accumulated stack into the postal tray which is then ejected from the apparatus.

BACKGROUND OF THE INVENTION

Flats mail, or large format pieces of mail, are typically transported in a standard United States Postal Service flats mail tray. Transportation of flats mail is necessary for example from a mailer (companies producing large volumes of mail) to post offices, and from one post office to other post offices. In the interests of efficiency and costs reduction, prior to transportation, the flats mailpieces are sorted and/or otherwise processed prior to being placed into the postal trays in a desired sequence.

There are numerous mail processing machines, which process mail and create groups of mail. These mail groups or mail stacks may consist of a single piece or a multitude of pieces. Individual mailpieces range in length from 4 inches to 15.75 inches, in width from 4 inches to 12 inches, and in thickness from 0.007 inches to 1.25 inches. Mail stacks must be transferred into the postal tray on edge, continuously until the tray is filled. Such loading of a mail tray has long been a manual process.

Accordingly, there is a need for a method and apparatus for high speed accumulation/stacking of flats mailpieces and loading of the same into postal trays in a desired sequence. The present invention fulfills such a need.

BRIEF SUMMARY OF THE INVENTION

The present invention comprises a method and system for combining multiple small stacks of mailpieces into a single large stack of mailpieces and then transferring the large stack to a standard United States Postal Service flats mail tray, all while maintaining the sequence order of the mail in the accumulated stack, i.e. first pieces processed on top of accumulated stack and last pieces on bottom.

The present invention is comprised of three primary subsystems: a bridge conveyor, a stack accumulator, and an output tray station. The bridge conveyor carries mailpieces from the exit conveyor of a mail processing machine such as a collator (for example, as disclosed in co-pending U.S. patent application entitled "Flats Bundle Collator" concurrently filed herewith, and herein incorporated by reference), to the stack accumulator. The stack accumulator combines small stacks of mailpieces into large stacks in a desired sequence. The output tray station provides support for an empty tray as the accumulated mail stack is transferred to the tray, and then releases the filled tray in a controlled manner.

The mail handling surfaces of the system are oriented so that mail stacks are maintained at a twenty degree incline from horizontal throughout the entire autotraying process which encourages the edges of flats mailpieces to uniformly register against a side belt of the bridge conveyor and/or side rollers of the stack accumulator. This configuration assists in controlling the movement of mailpieces and maintaining the sequence order integrity of the accumulated mail stack.

Accordingly, it is the principle object of the present invention to provide a method and system for high speed traying of mailpieces, and in particular flats mailpieces.

It is also an object of the invention to provide a method and apparatus for accumulating and stacking of small mailpiece groups into a large mailpiece group.

It is an additional object of the present invention to provide an accumulation/stacking system which maintains the sequence order of small mailpiece groups in an accumulated stack.

It is another object of the present invention to provide a system which sequentially receives mailpieces from the exit conveyor of a mail processing machine, delivers the mailpieces to an accumulator/stacking apparatus, stacks the mailpieces in a desired sequence, and delivers the accumulated stack to a tray.

Numerous other advantages and features of the invention will become readily apparent from the detailed description of the preferred embodiment of the invention, from the claims, and from the accompanying drawings in which like numerals are employed to designate like parts throughout the same.

BRIEF DESCRIPTION OF THE DRAWINGS

A fuller understanding of the foregoing may be had by reference to the accompanying drawings wherein.

DETAILED DESCRIPTION OF THE PREFERRED EMBODIMENT OF THE PRESENT INVENTION

Figure 1:
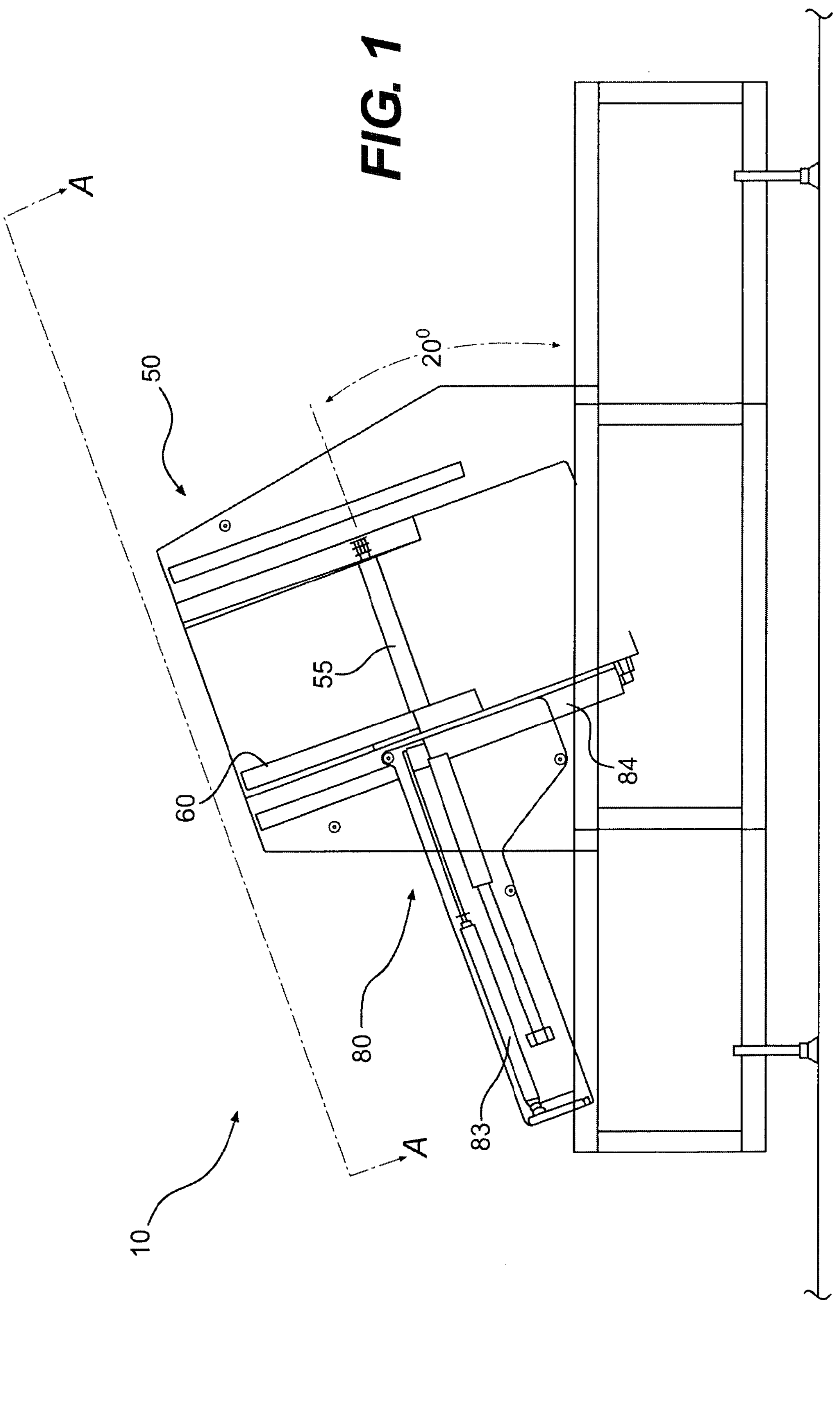
FIG. 1 is an end view of the present invention.

While the invention is susceptible of embodiment in many different forms, there is shown in the drawings and will be described herein in detail a preferred embodiment of the invention. It should be understood however that the present disclosure is to be considered an exemplification of the principles of the invention and is not intended to limit the spirit and scope of the invention and/or claims of the embodiment illustrated.

Figure 2:
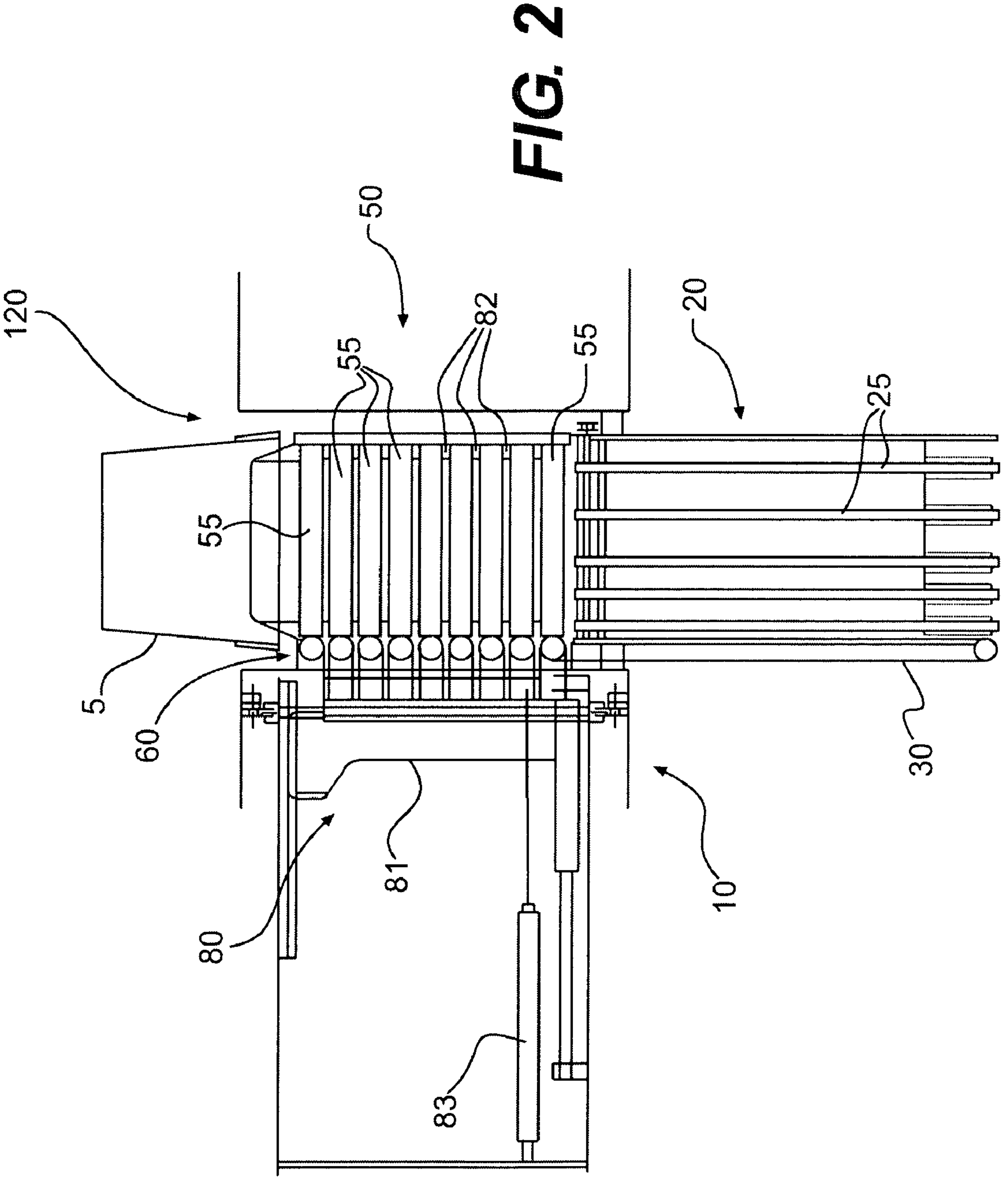
FIG. 2 is a top view of the present invention as seen in the direction of line A—A of FIG. 1.
Figure 3:
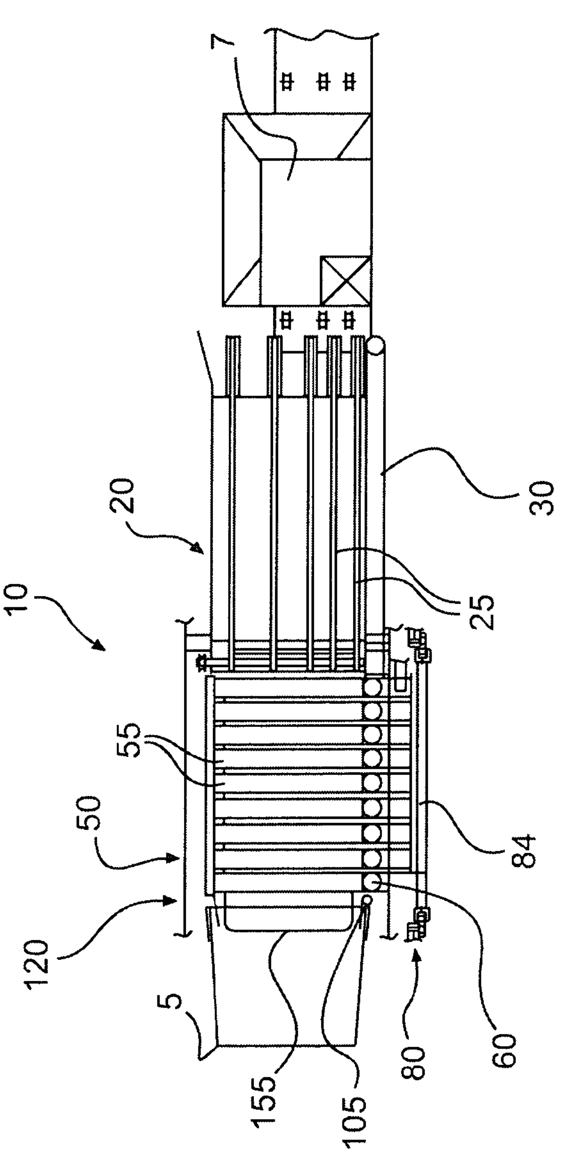
FIG. 3 is a top schematic view of the present invention illustrating the mail stack flow.
Figure 4:
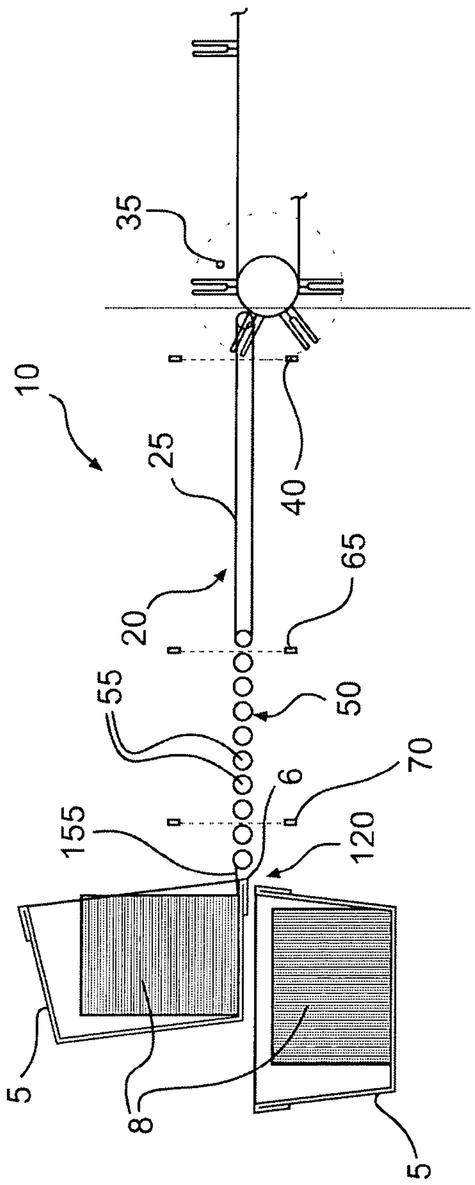
FIG. 4 is a side schematic view of the present invention illustrating the mail stack flow.

With reference now to FIGS. 1–4, the present invention 10 is generally illustrated as comprising a bridge conveyor 20, a stack accumulator 50, and an output tray station 120, as best seen in FIGS. 2–4. FIG. 1, illustrates an end view illustrating the orientation of the present invention 10 at a twenty degree angle to the horizon.

The bridge conveyor 20 can be seen in FIGS. 2 and 3 as having a plurality of conveyor belts 25 and a side belt 30 which support and guide the individual mail stacks on the bottom and side respectively, and transports the individual mail stacks to the stack accumulator.

Figure 7:
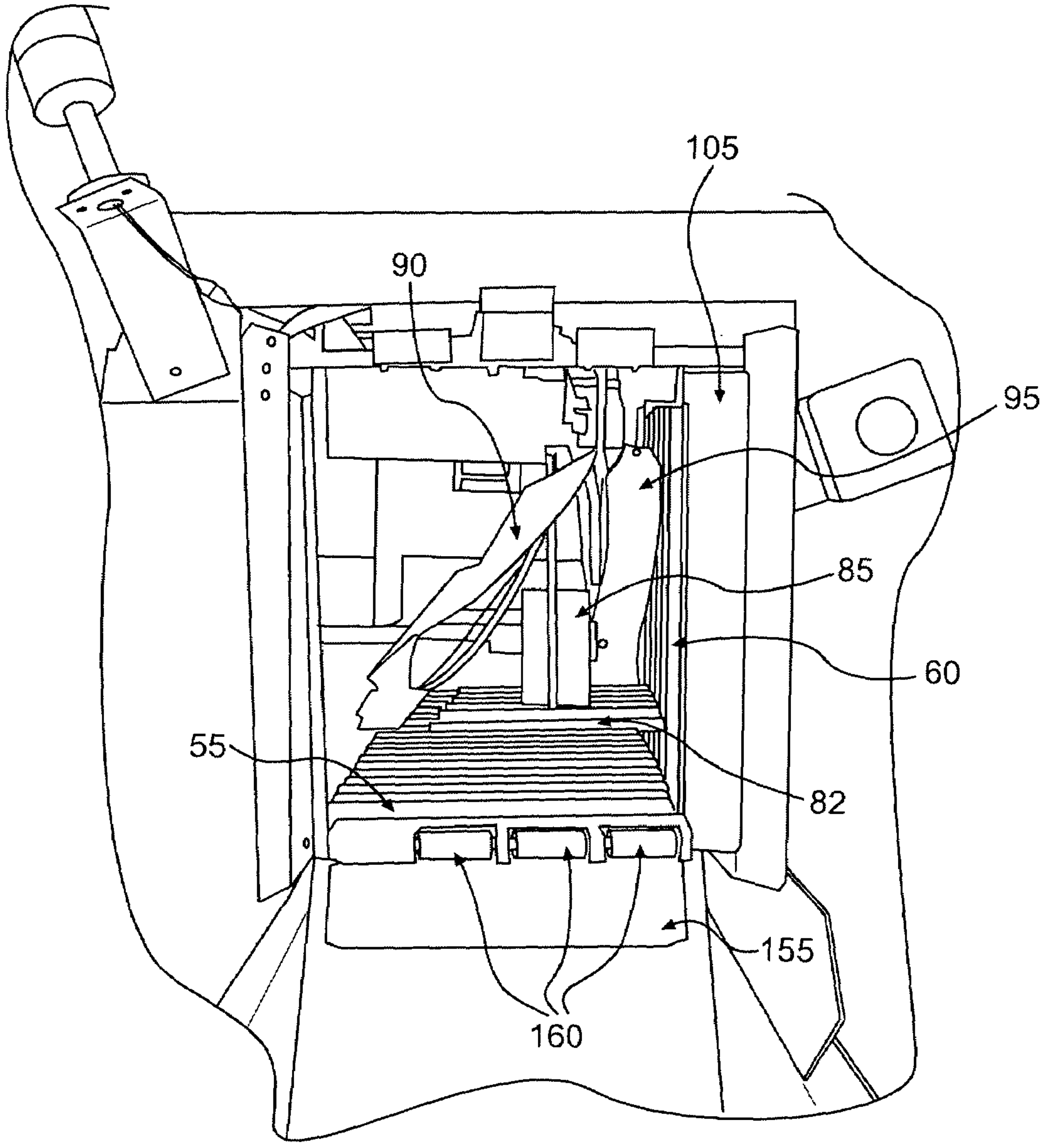
FIG. 7 is a front perspective view of the stack accumulator.
Figure 8:
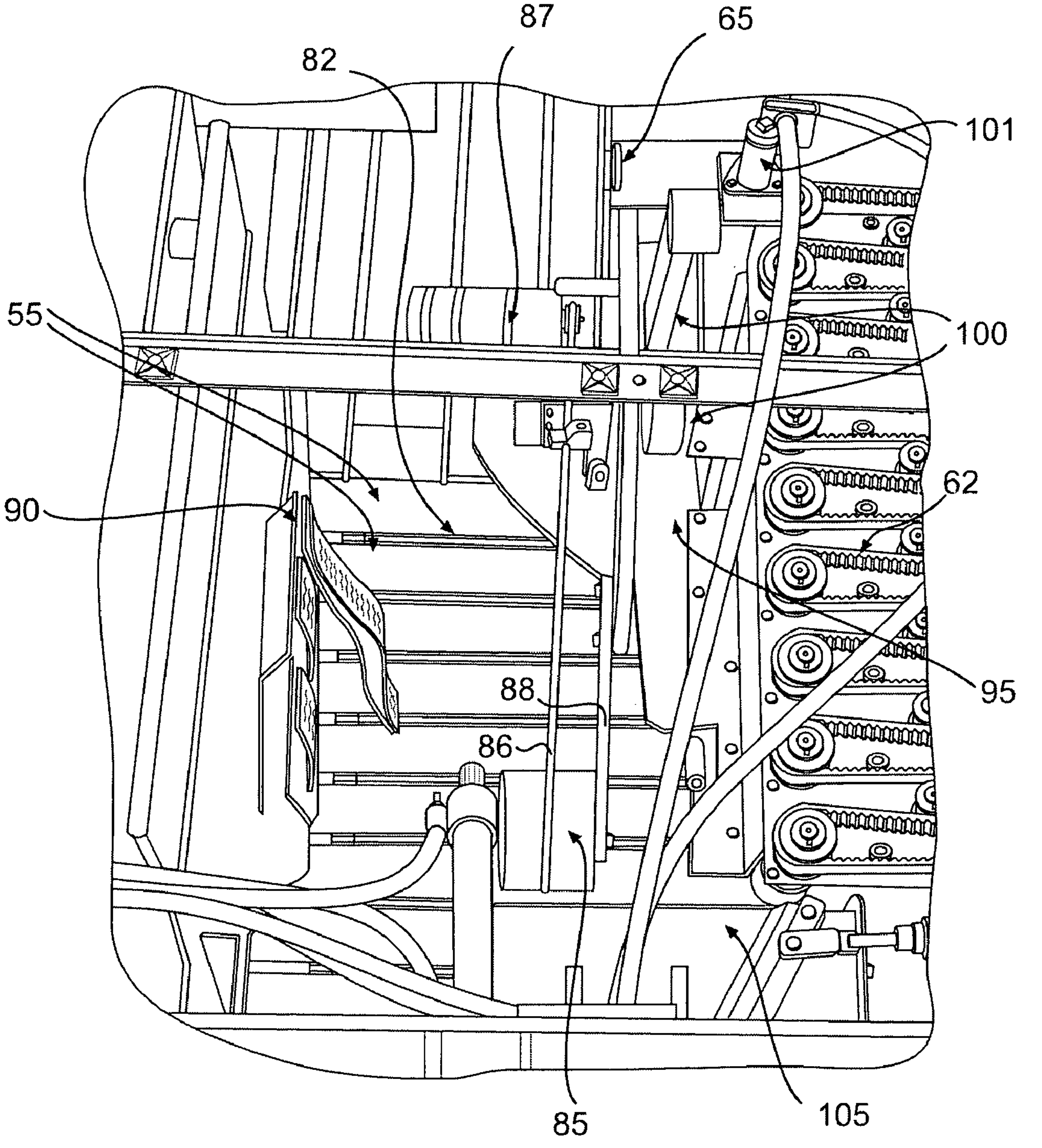
FIG. 8 is a top perspective view of the stack accumulator.
Figure 9:
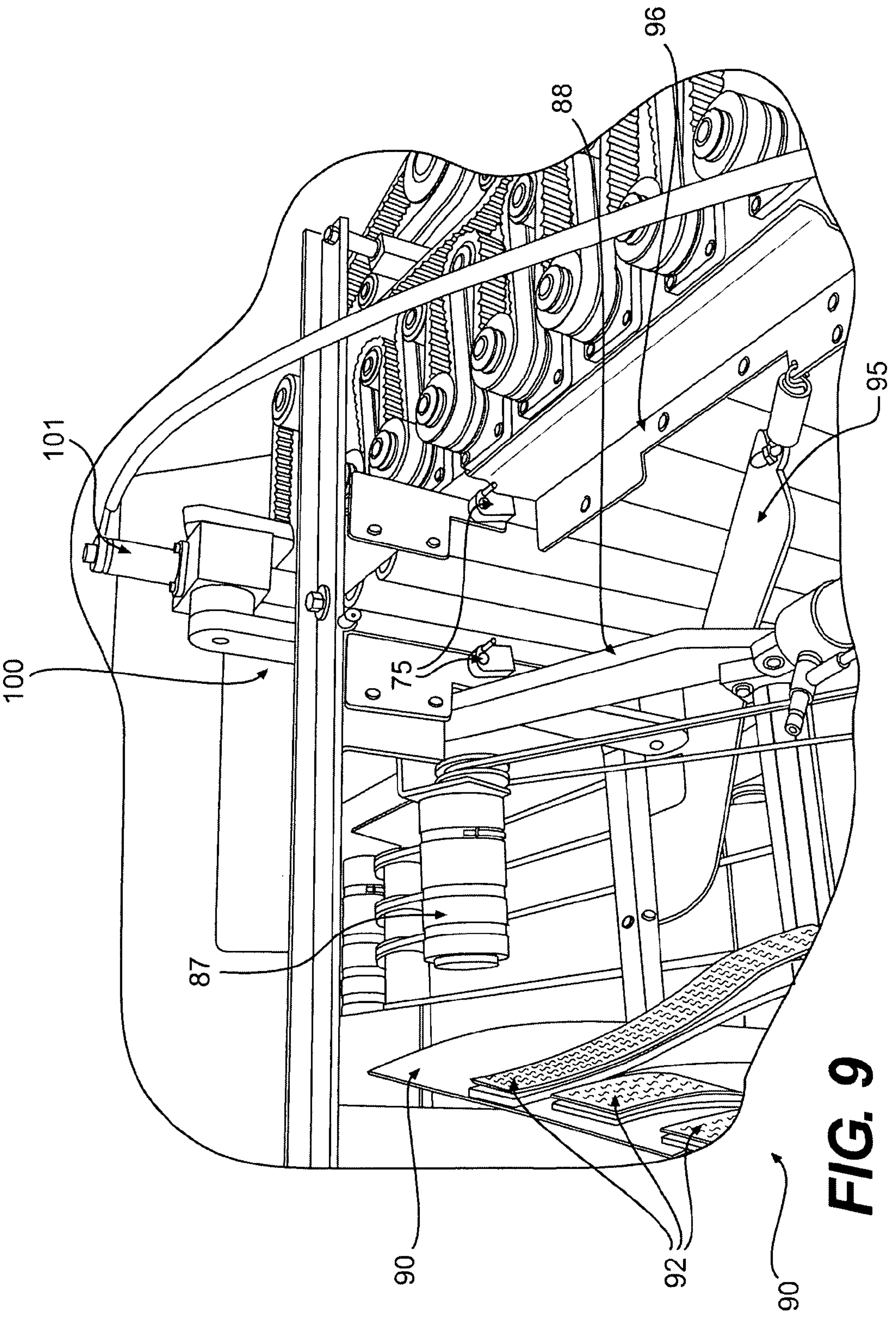
FIG. 9 is an enlarged perspective view of the stack accumulator of the present invention.

The stack accumulator 50 can be seen in FIGS. 1–3 as having bottom rollers 55 and side rollers 60 which support and guide the individual mail stacks on the bottom and side respectively. The fork assembly 80 of the stack accumulator 50 can also be seen as having a fork weldment 81 having fork elements 82 (see FIGS. 2, 7 and 8) shown between rollers 55. A fork actuation air cylinder 83 actuates the fork assembly to move the fork elements in and out of contact with mailpieces; and a fork lift air cylinder 84 raises and lowers the fork assembly, as will be described in more detail below.

The output tray station 120 can be seen generally in FIGS. 2 and 3 at the end of the stack accumulator 50. The output tray station 120 receives a tray 5, as will be described in more detail below.

FIG. 4 shows a schematic view of the present invention 10. The bridge conveyor is positioned proximate the exit conveyor of a mail processing machine, such as a collator. A stack height sensor 35, which actuates a second stage of the fork lift cylinder as described in more detail below, is positioned just prior to the entrance of the bridge conveyor 20. A jam detect sensor 40 is positioned at the entrance of the bridge conveyor 20 to determine if a jam has occurred at the entrance of the bridge conveyor.

The stack accumulator 50 is positioned proximate the end of the bridge conveyor 20. Another jam detect sensor 65 is positioned at the entrance of the stack accumulator 50 to determine if a jam has occurred at the entrance of the stack accumulator. Towards the end of the stack accumulator, a fork cycle trigger sensor 70 is located to trigger the fork cycle as will be described in more detail below.

The output tray station 120 is positioned at the end of the stack accumulator 50. As will be described in more detail later, the output tray station receives and supports an empty mail tray for loading of the accumulated stack, and the releases the tray once filled.

Figure 5:
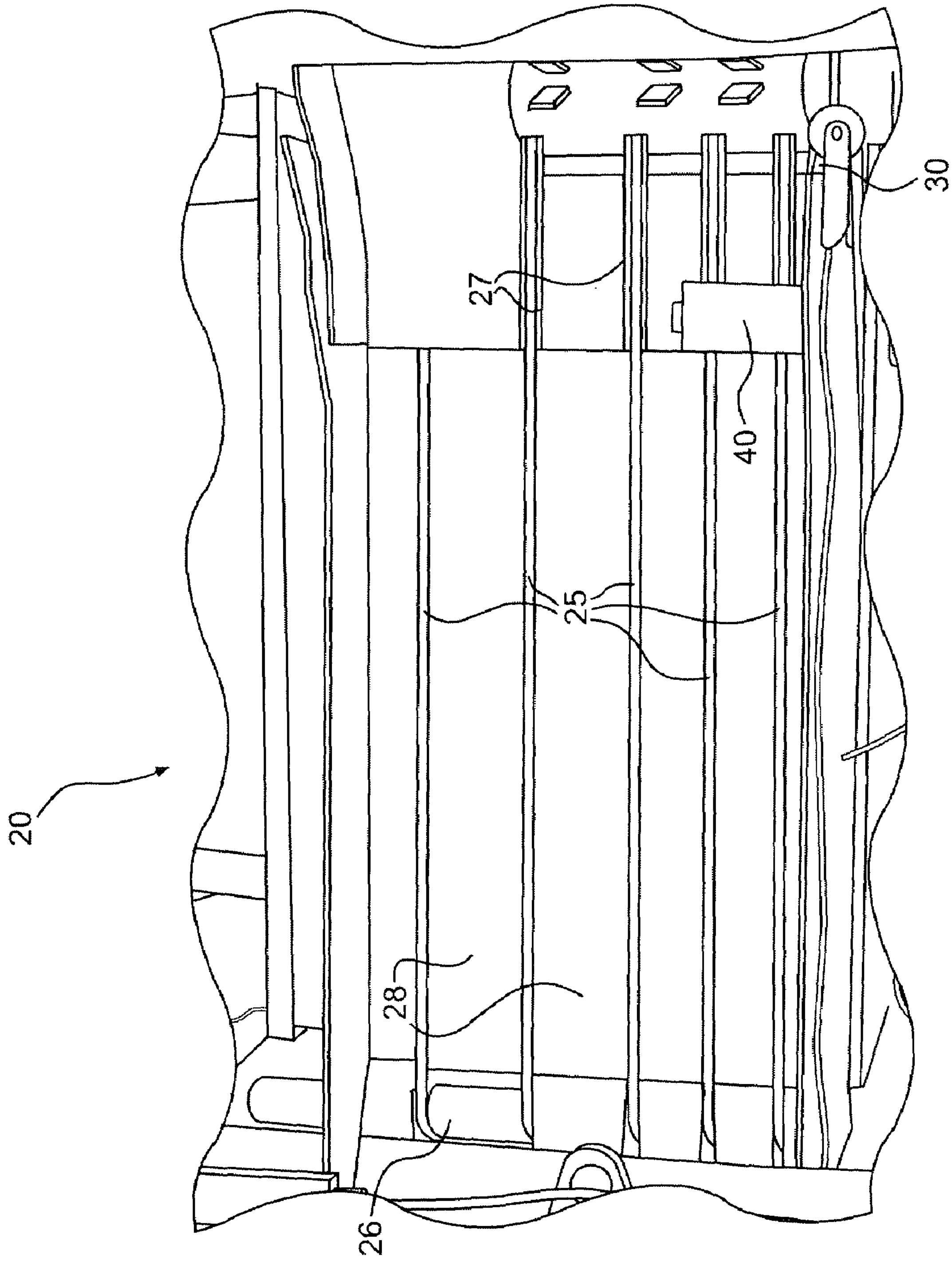
FIG. 5 is a top perspective view of the bridge conveyor of the present invention.
Figure 6:
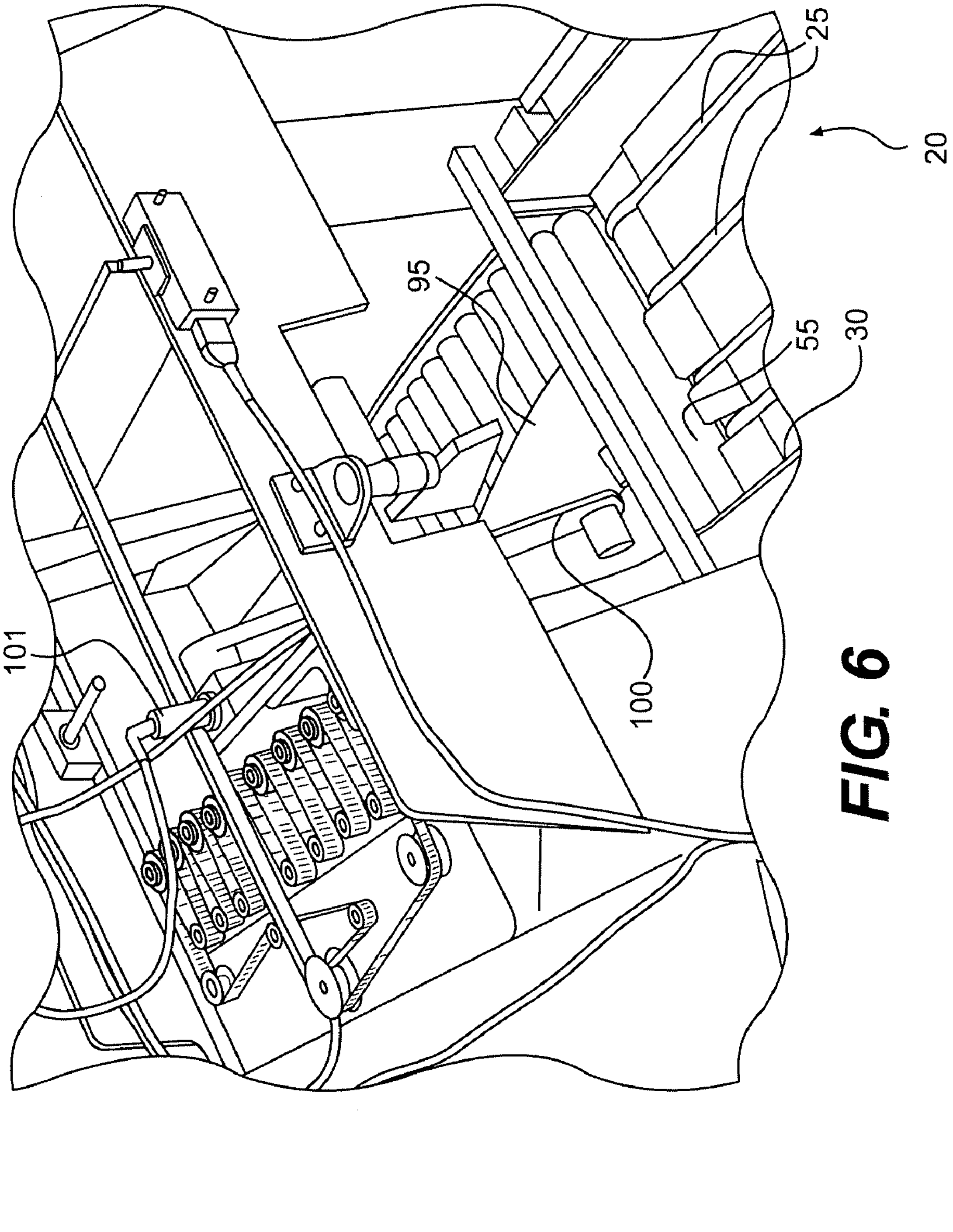
FIG. 6 is a perspective view of the bridge conveyor and the stack accumulator of the present invention.

Referring now to FIGS. 5 and 6, the bridge conveyor 20 is shown consisting of the following significant components. Five O-Ring type conveyor belts 25, or any suitably number and type of conveyor belts, are provided to contact the bottom mailpiece of an incoming mailpiece stack, and transport the stack to the stack accumulator 20. The O-rings are supported and driven along a conveyor platform 28 by any suitable combination of a drive pulley 26 and idler pulleys 27, as is known in the art. A flat side belt 30 contacts and drives, via any suitable drive means known in the art, the edges of all mailpieces of the incoming stack. A stack height sensor 35 (see FIG. 4) actuates a second stage of lift fork cylinder 84 when blocked. Finally, the jam detect sensor 40 is shown positioned at the entrance to the bridge conveyor 20, which stops the present invention 10 when blocked for an excessive amount of time.

Referring now to FIGS. 6–9, the stack accumulator 50 is shown consisting of the following significant components. A plurality of driven bottom rollers 55 contact the bottom mailpiece in stack and selectively moves the stack. A plurality of driven side rollers 60 contact the edges of all of the mailpieces in a stack. These rollers 55, 60 are slightly spaced apart, enough distance to allow the fort lift fingers or elements 82 to freely pass between.

A jam detect sensor 65 (FIG. 8) is provided at the entrance of the stack accumulator to stop the present invention, when this sensor is blocked for excessive amount of time.

A fork cycle trigger sensor 70 (FIG. 4) is positioned towards the end of the stack accumulator to initiate a fork actuation cycle when triggered by the incoming individual stack to the accumulated stack, as described below.

A stack height limit sensor 75 (FIG. 9) initiates the process of transferring the accumulated stack to the tray when the height of the accumulated stack is great enough to trigger the sensor.

A fork assembly 80 comprising at least one lift fork element 82 (eight fingers shown), lifts the accumulated stack off of bottom rollers 55, allowing a subsequent individual stack to be moved thereunder.

A top roller assembly 85 controls the top of accumulated mail stack and triggers the stack height limit sensor 75. A side guide assembly 90 controls the outside of accumulated mail stack, preventing mailpieces from sliding off of the accumulated stack on the outside. A rear flexible guide 95 controls the back of the accumulated mail stack, preventing mailpieces from sliding off of the accumulated stack in back.

A pusher arm 100 pushes on the rear of the accumulated stack during stack transfer process. A stack transfer gate 105 provides a surface for individual mail stacks to register against when they enter the stack accumulator 50.

Figure 10:
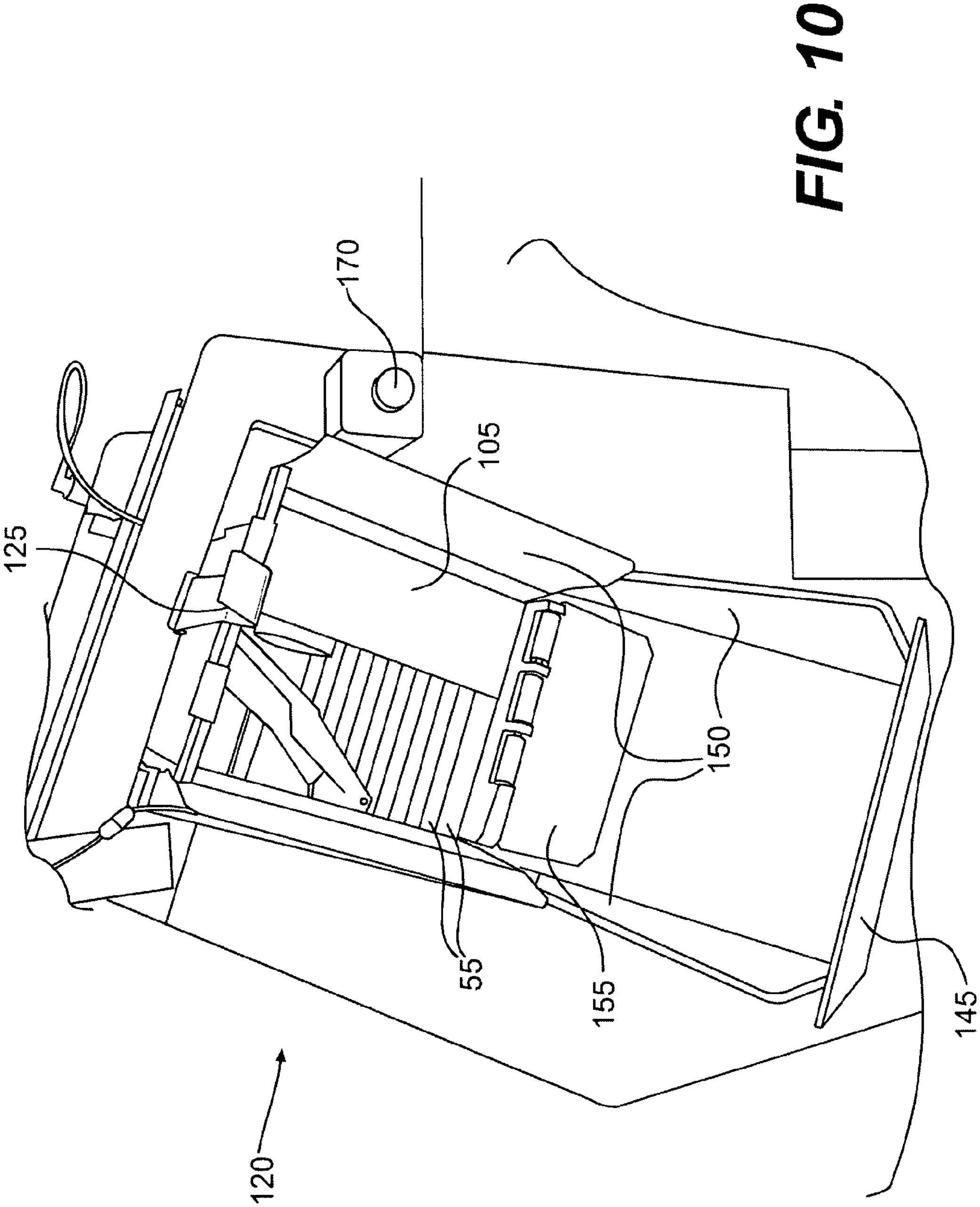
FIG. 10 is a front perspective view of the output tray station of the present invention.
Figure 11:
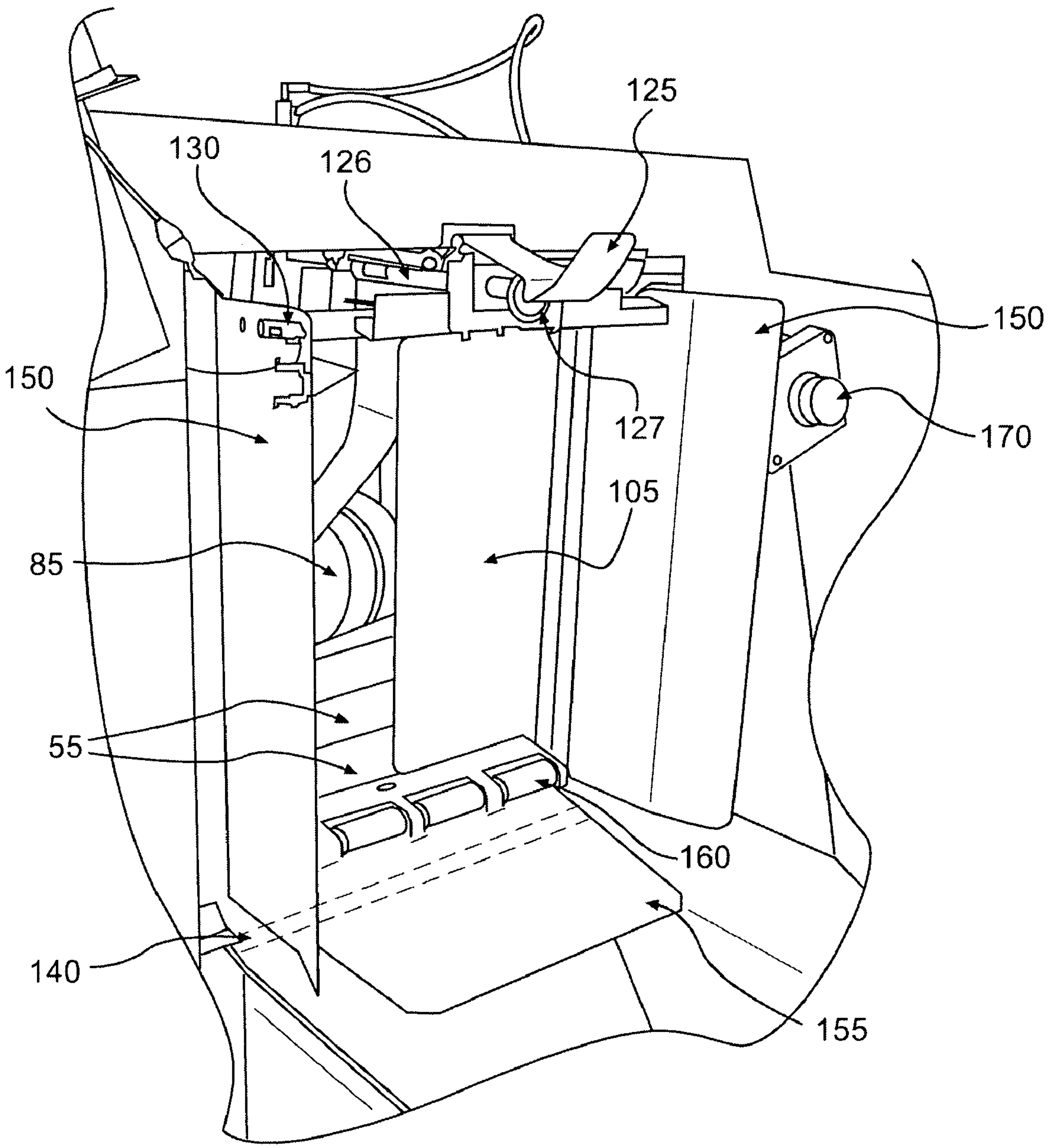
FIG. 11 is an enlarged perspective view of the output tray station of the present invention.
Figure 12:
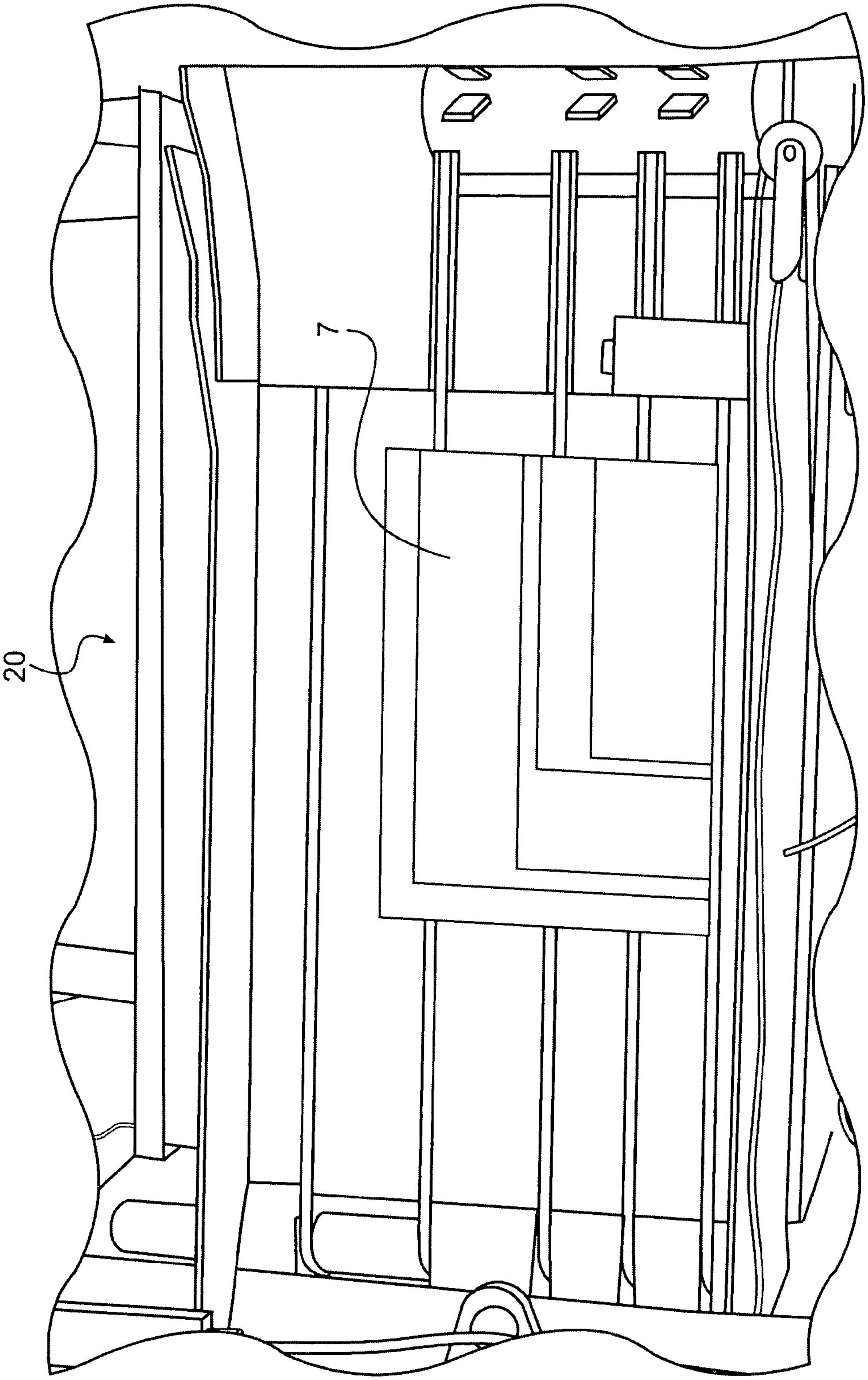
FIG. 12 is a top perspective view of the bridge conveyor of the present invention in use.
Figure 13:
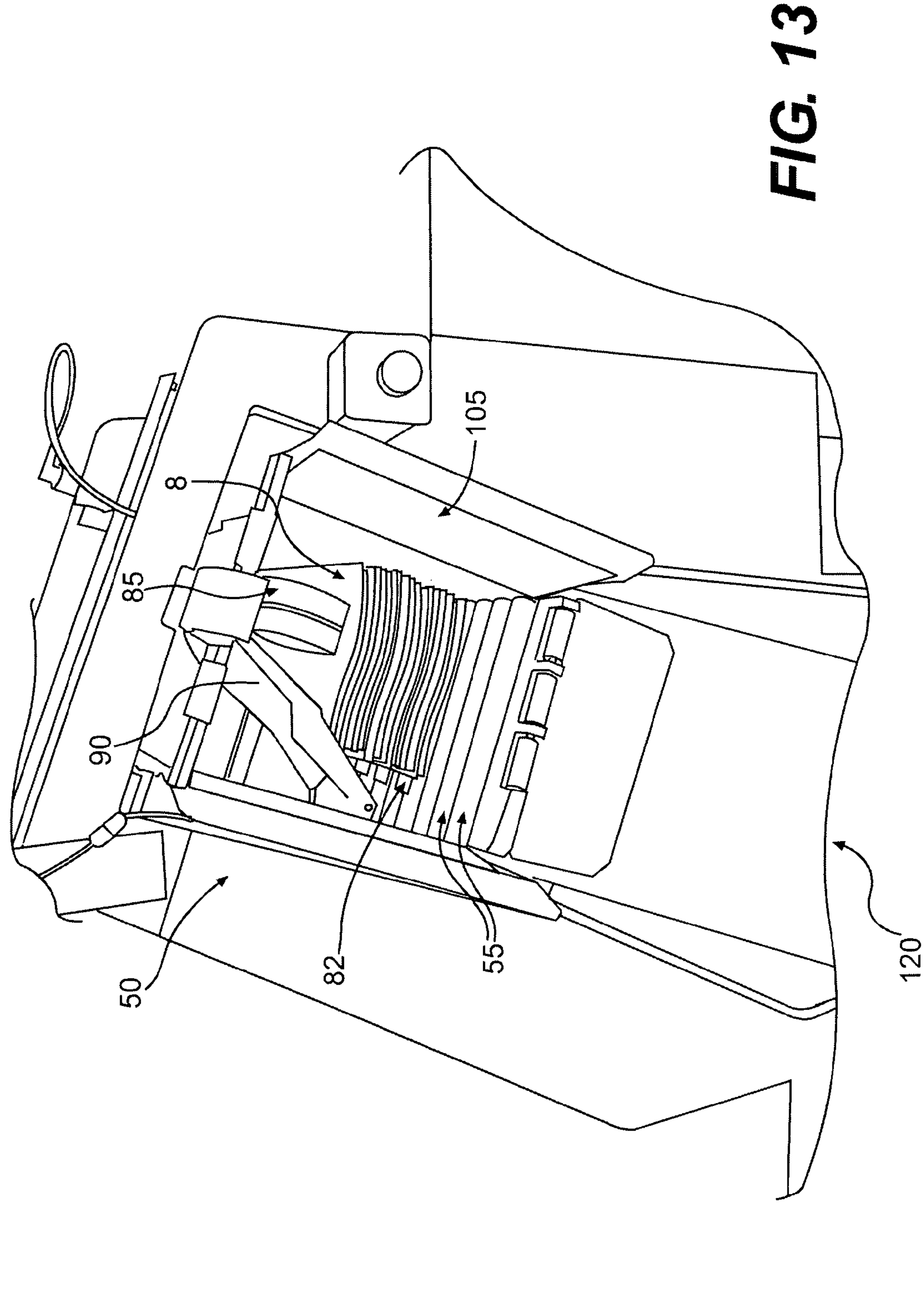
FIG. 13 is a front perspective view of the stack accumulator of the present invention in use.
Figure 14:
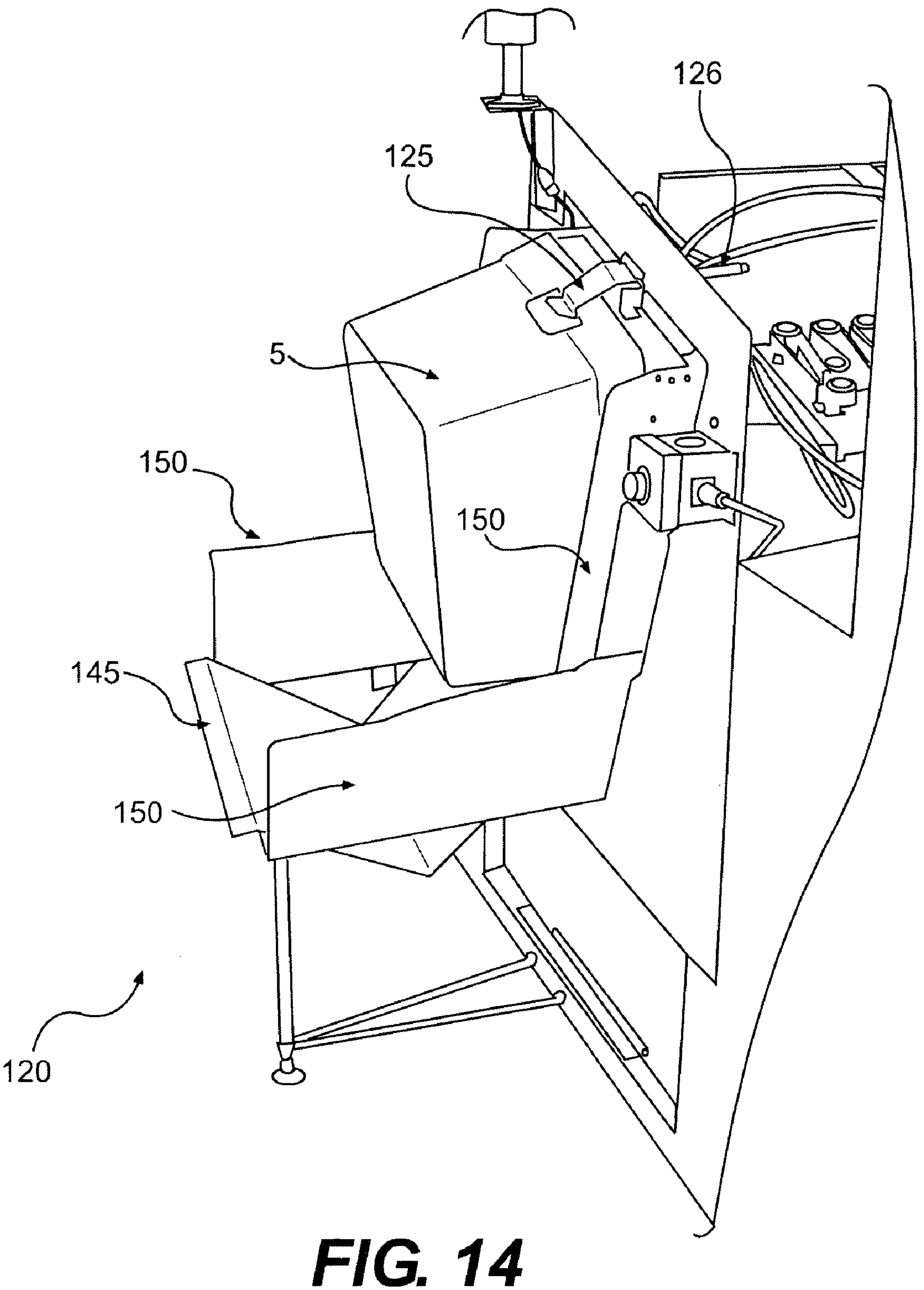
FIG. 14 is a perspective view of the output tray station of the present invention with a tray in position to receive a mail stack.

Referring now to FIGS. 10 and 11, the output tray station 120 is shown consisting of the following significant components. A tray latch assembly 125 secures an empty tray 5 in position for accumulated stack transfer, and automatically releases the filled tray 5, as described in more detail below.

Figure 15:
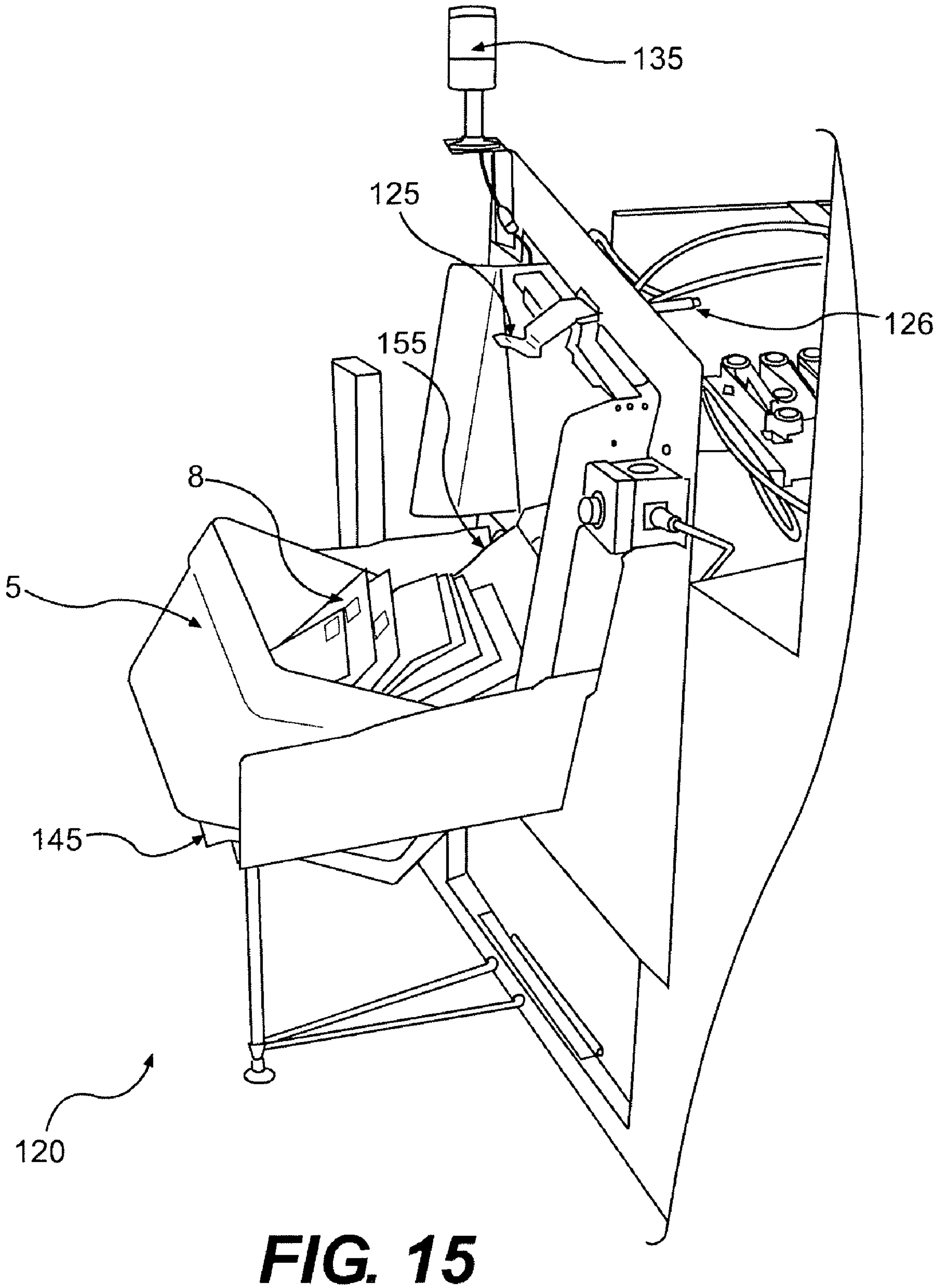
FIG. 15 is a perspective view of the output tray station of the present invention with a filled tray in a position to be removed from the present invention.

A tray detect sensor 130 detects when an empty tray is in position for the accumulated stack transfer process. A tray not-in-place indicator lamp 135 (see FIG. 15), operatively connected to the tray detect sensor 130, illuminates when an empty tray is not in position for accumulated stack transfer.

An empty tray support ledge 140 provides support for the bottom lip 6 (see FIG. 4) of the empty tray 5 that is in the accumulated stack transfer position. A full tray support platform 145 supports the filled tray at an ergonomically correct height for an operator.

A plurality of tray guides 150 assist the operator to position empty tray onto the output tray station, and guide filled trays when the latch assembly 125 releases. Flexible mail guides 155 and a plurality of idler rollers 160 guide the bottom of accumulated mail stack as it is transferred to tray. Additionally, an emergency stop button 170 is provided which stops the present invention 10 when pressed.

The operation of the system will now be described with respect to FIGS. 12–15. System operation begins when a mail stack 7 is transferred from the exit conveyor of a mail processing machine to the bridge conveyor 20 of the present invention 10. When a mail stack 7 blocks the stack height sensor 35 as it passes from the exit conveyor to the bridge conveyor 20, the second stage of the lift fork air cylinder 84 is actuated to raise the accumulated stack to provide additional clearance between the accumulated stack and the underside of the lift fork elements 82. This stack height sensor 35 is positioned prior to entrance of the bridge conveyor 20.

Mail stacks 7 pass through a jam detect sensor beam 40 as they enter the bridge conveyor 20. If the beam is blocked for an excessive amount of time, the control system of the present invention 10 declares that a mail jam has occurred and the system is stopped. Mail stacks 7 also pass through a jam detect sensor beam 65 as they exit the bridge conveyor 20 and enter the stack accumulator 50. If the beam is blocked for an excessive amount of time, the control system of the present invention declares that a mail jam has occurred and the system is stopped.

Mail stacks 7 are conveyed from the bridge conveyor 20 into the stack accumulator by bottom belts 25 and a side belt 30. The surface speed of the bridge conveyor belts is identical to that of the bottom rollers 55 and side rollers 60 in the stack accumulator 50. Mail stacks 7 are driven into the stack accumulator 50 by rollers 55 and 60 until they stop against the vertical surface of the stack transfer gate 105. The side rollers 60 rotate continuously throughout system operation. The bottom rollers 55 are paused when the fork cycle is performed.

When the lead edge of an incoming mail stack 7 passes through the beam of the fork cycle trigger sensor 70, the bottom rollers 55 stop rotating and the lift fork cycle is performed. The fork cycle trigger sensor 70 is preferably located approximately three inches prior to the gate 105. The fork cycle consists of the following series of movements. The lift fork elements 82, holding the accumulated stack 8, retract between the rollers 60 until the elements are completely behind the surface of the side rollers 60. Thus, the accumulated mail stack drops on top of the incoming mail stack 7. The fork elements 82 next lower to a position where the elements 82 are below the top surface of the bottom rollers 55. Then, the fork elements 82 extend back into the stack accumulator 50, between and/or under the rollers 55, and under the accumulated stack 8. Finally, the fork elements 82 rise to a nominal position above the top surface of the bottom rollers 55, allowing the subsequent stack 7 to move under the accumulated stack 8.

The fork cycle is repeated for each mail stack 7 that enters the accumulator 50. Again, each time the fork elements 82 are retracted, the accumulated mail stack 8 falls on top of the incoming stack 7 that has just registered against the vertical surface of the gate 105. When the elements 82 of the fork assembly 80 rise from between the bottom rollers 55, the accumulated stack 8 is raised off of the bottom rollers 55 so that another incoming stack 7 can enter the accumulator.

A top roller assembly 85 operatively mounted to a pivot arm 88 rests on top of the accumulated mail stack 8 as the fork cycles are performed. The roller 85 moves up and down via pivot arm 88 with the accumulated stack 8. The weight of this roller 85 exerts a pressure to the top of the stack 8 that assists in maintaining stack integrity.

During the course of a fork cycle, if the top roller pivot arm 88 blocks the stack height limit sensor beam 75 when the accumulated mail stack 8 is resting on the bottom rollers 55, the stack transfer process is initiated. The top roller assembly 85 in conjunction with the stack height limit sensor 75 acts as the maximum stack height gage.

The stack transfer process consists of the following actions. The bottom rollers 55 are actuated, the top roller drive motor 87 is activated, the side guide assembly 90 is retracted, the gate 105 is opened, the pusher arm 100 is actuated, and the tray latch cylinder 126 is actuated. The accumulated mail stack 8 is driven on three sides into the mail tray 5 during the stack transfer process by the bottom rollers 55, side rollers 60 and top roller 85. In addition, as the pusher arm 100 rotates towards the mail tray 5, a roller mounted on the end of the pusher arm 100 stays in contact with the backside of the rear flexible guide 95. The resulting effect of this actuation on the mail stack 8 is similar to that of a wall pushing on the rear of the stack 8.

The side guide 90 is retracted, by any suitable means, during the stack transfer process so that the high friction belt strips 92, which are attached to the guide 90, do not inhibit the movement of the stack 8 into the mail tray 5.

When the tray latch cylinder 126 is actuated, a plastic disc 127 mounted on the end of the cylinder rod is extended towards the tray 5. The disc 127 initially disengages the latch 125 from the tray 5 and then pushes on the tray 5 to ensure that it falls clear of the gate 105 at the appropriate time within the cycle. The momentum of the mail stack 8 striking the tray 5 and force of gravity complete the process of lowering the tray 5 to the tray support platform 145.

When a filled tray 5 is ejected from the empty tray position, the tray detect sensor 130 is unblocked. This condition causes the tray not-in-place lamp 135 to illuminate which alerts the operator that the filled tray 5 must be removed and an empty tray 5 installed. If the tray detect sensor 130 remains unblocked when a stack transfer is initiated, system operation automatically stops.

All drive means and sensors are operatively connected to suitable controllers, such as programable logic controllers to synchronize operation of all assemblies of the present invention. As described above, the present invention provides for constant control of each mail stack, accumulated mail stack, and tray to achieve the accumulating/stacking of individual mail stacks into one accumulated mail stack, in the desired sequence, and the transfer of the accumulated mail stack into the tray. The height of the accumulated stack that is transferred to the mail tray is preferably approximately 12 inches.

It should be understood that the embodiments herein described are merely illustrative of the principles of the present invention. Various modifications may be made by those skilled in the art without departing from the spirit or scope of the claims which follow. Other modifications or substitutions with equivalent elements are also contemplated.

What is claimed is:

1. A flats mail autotraying system comprising:

a stack accumulator having means for combining multiple small stacks of mailpieces into a single large stack of mailpieces while maintaining sequence order; and the stack accumulator also having means for transferring said large stack to a tray, wherein the means for transferring includes a plurality of driven rollers, and wherein the plurality of driven rollers includes driven bottom rollers and driven side rollers.

2. The system of claim 1, further comprising means for releasably engaging a tray.

3. The system of claim 2, wherein the means for releasably engaging a tray includes a tray latch assembly and a tray support ledge.

4. The system of claim 1, wherein said means for combining includes a fork lift assembly.

5. The system of claim 4, wherein said fork lift assembly is selectively raised and lowered, and is selectively positionable into and out of contact with said large stack during a fork lift cycle.

6. The system of claim 5, further comprising a sensor for initiating the fork lift cycle when one of the small stacks of mailpieces is sensed by the sensor.

7. The system of claim 6, wherein the fork lift assembly extends under and holds the large stack above one of the small stacks of mailpieces, retracts when the fork lift cycle is initiated, releasing the large stack onto one of the small stacks of mailpieces to create a new large stack, lowers to a position under the new large stack, advances back under the new large stack, and raises to lift the new large stack to complete the fork lift cycle.

8. The system of claim 1, wherein said means for transferring further includes a means for pushing.

9. The system of claim 1, wherein said stack accumulator maintains a sequence order of the mailpieces in said large stack by placing successive small stacks on the bottom of the large stack.

10. The system of claim 1, wherein said stack accumulator includes a plurality of guides.

11. The system of claim 10, wherein said plurality of guides includes a side guide assembly.

12. The system of claim 11, wherein said side guide assembly is retractable.

13. The system of claim 10, wherein said plurality of guides includes a rear guide assembly.

14. The system of claim 13, wherein said rear guide assembly is a flexible belt.

15. The system of claim 1, wherein said stack accumulator includes a gate.

16. The system of claim 1, wherein said stack accumulator includes a pusher arm.

17. The system of claim 1, wherein the stack accumulator further comprises at least one of a side guide assembly and a rear guide assembly.

18. The system of claim 1, wherein said plurality of rollers includes a top roller operatively connected to a pivot arm, the pivot arm raising as successive small stacks are added to the large stack, the pivot arm triggering a stack height limit sensor upon the large stack reaching a predetermined height, whereupon the stack accumulator transfers the large stack to the tray.

19. A flats mail autotraying system comprising:

a stack accumulator having a fork lift assembly for combining multiple small stacks of mailpieces into a single large stack of mailpieces while maintaining sequence order;

the stack accumulator also having a plurality of rollers for transferring said large stack to a tray;

wherein the stack accumulator sequentially receives a stream of small stacks of mailpieces, and maintains a sequence order of the mailpieces in said large stack by placing successive small stacks on the bottom of the large stack; and wherein the plurality of rollers includes driven bottom rollers and driven side rollers.

20. The system of claim 19, wherein the stack accumulator further comprises a tray engagement assembly for releasably engaging a tray, wherein the tray engaging assembly engages an empty tray as the large stack is transferred to the tray, and releases the tray once filled.

21. The system of claim 20, wherein the tray engagement assembly includes a tray latch assembly, a tray support ledge, and at least one mail guide.

22. The system of claim 19, further comprising a sensor for initiating a fork lift cycle when each of said small stacks of mailpieces advances into said sensor.

23. The system of claim 22, wherein said fork lift extends under and holds said large stack above each of said small stacks of mailpieces, retracts when said fork lift cycle is initiated, releasing said large stack onto each of said small stacks of mailpieces, lowers to a position under said large stack, advances back under said large stack, and raises to lift said large stack to complete said fork lift cycle.

24. The system of claim 19, wherein the plurality of rollers further includes a top roller.

25. The system of claim 24, further comprising a stack height limit sensor, wherein the top roller is operatively connected to a pivot arm, and wherein the pivot arm raises as successive small stacks are added to the large stack to trigger the stack height limit sensor upon the large stack reaching a predetermined height.

26. The system of claim 25, wherein the stack accumulator transfers the large stack to the tray upon the stack height limit sensor being triggered.

27. The system of claim 19, wherein the stack accumulator further includes a plurality of guides.

28. The system of claim 27, wherein the plurality of guides includes a retractable side guide assembly.

29. The system of claim 28, wherein the retractable side guide assembly includes high friction belt strips.

30. The system of claim 27, wherein the plurality of guides includes a rear guide assembly.

31. The system of claim 30, wherein the rear guide assembly is a flexible belt.

32. The system of claim 19, wherein the stack accumulator includes a gate, wherein the gate is closed during the accumulation of the large stack, and opens during the transfer of the large stack to the tray.

33. The system of claim 19, wherein the stack accumulator includes a pusher arm which pushes on the large stack during the transfer of the large stack to the tray.

34. A flats mail autotraying system comprising:

a stack accumulator having means for combining multiple small stacks of mailpieces into a single large stack of mailpieces while maintaining sequence order; and the stack accumulator also having means for transferring said large stack to a tray, wherein said stack accumulator includes a plurality of guides, and wherein said plurality of guides includes a side guide assembly, and wherein said side guide assembly includes high friction belt strips.

35. A flats mail autotraying system comprising:

a stack accumulator having means for combining multiple small stacks of mailpieces into a single large stack of mailpieces while maintaining sequence order; and the stack accumulator also having means for transferring said large stack to a tray, wherein said stack accumulator includes a plurality of guides, and wherein said plurality of guides includes a rear guide assembly, and wherein said rear guide assembly is a flexible belt.

36. A flats mail autotraying system comprising:

a stack accumulator having a fork lift assembly for combining multiple small stacks of mailpieces into a single large stack of mailpieces while maintaining sequence order;

the stack accumulator also having a plurality of rollers for transferring said large stack to a tray;

wherein the stack accumulator sequentially receives a stream of small stacks of mailpieces, and maintains a sequence order of the mailpieces in said large stack by placing successive small stacks on the bottom of the large stack;

wherein the stack accumulator further includes a plurality of guides;

wherein the plurality of guides includes a retractable side guide assembly; and wherein the retractable side guide assembly includes high friction belt strips.

37. A flats mail autotraying system comprising:

a stack accumulator having a fork lift assembly for combining multiple small stacks of mailpieces into a single large stack of mailpieces while maintaining sequence order;

the stack accumulator also having a plurality of rollers for transferring said large stack to a tray;

wherein the stack accumulator sequentially receives a stream of small stacks of mailpieces, and maintains a sequence order of the mailpieces in said large stack by placing successive small stacks on the bottom of the large stack;

wherein the stack accumulator further includes a plurality of guides;

wherein the plurality of guides includes a rear guide assembly; and wherein the rear guide assembly is a flexible belt.

* * * * *